(12) United States Patent
Shrestha et al.

(10) Patent No.: US 12,407,964 B2
(45) Date of Patent: Sep. 2, 2025

(54) SYSTEM, METHOD, AND COMPUTER PROGRAM FOR IMPLEMENTING A CLOUD HOSTED DEVELOPMENT MODULE

(71) Applicant: JPMorgan Chase Bank, N.A., New York, NY (US)

(72) Inventors: Shailesh Shrestha, London (GB); Dennis Martin, Outwood (GB); Grzegorz Stencel, Bournemouth (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 192 days.

(21) Appl. No.: 18/198,069

(22) Filed: May 16, 2023

(65) Prior Publication Data
US 2024/0385807 A1    Nov. 21, 2024

(51) Int. Cl.
| | | |
|---|---|---|
| H04R 1/02 | (2006.01) | |
| G06F 8/20 | (2018.01) | |
| G06F 9/50 | (2006.01) | |
| H04W 4/80 | (2018.01) | |

(52) U.S. Cl.
CPC ............... *H04R 1/021* (2013.01); *G06F 8/20* (2013.01); *G06F 9/5072* (2013.01); *H04R 1/026* (2013.01); *H04R 1/028* (2013.01); *H04W 4/80* (2018.02); *H04R 2420/07* (2013.01)

(58) Field of Classification Search
CPC . G06F 8/30; G06F 8/20; G06F 9/5072; G06F 9/547
See application file for complete search history.

(56) References Cited

U.S. PATENT DOCUMENTS

| | | | | |
|---|---|---|---|---|
| 2016/0378439 A1* | 12/2016 | Straub | ..................... | G06F 8/61 717/107 |
| 2020/0153699 A1* | 5/2020 | Bai | .................. | H04L 67/10 |
| 2020/0334054 A1* | 10/2020 | Gulwani | .................. | G06F 8/33 |
| 2021/0312393 A1* | 10/2021 | Stump | .................. | G06F 8/20 |

OTHER PUBLICATIONS

G. Fylaktopoulos et al.; An overview of platforms for cloud based development; SpringerPlus; 13 pages; retrieved on Apr. 29, 2025 (Year: 2016).*
Ling Wu et al.; CEclipse : An Online IDE for Programing in the Cloud; IEEE; pp. 45-52; retrieved on Apr. 29, 2025 (Year: 2011).*

* cited by examiner

*Primary Examiner* — S. Sough
*Assistant Examiner* — Cuong V Luu
(74) *Attorney, Agent, or Firm* — GREENBLUM & BERNSTEIN, P.L.C.

(57) ABSTRACT

Various methods, apparatuses/systems, and media for developing a cloud application. A processor automatically provisions a user specific native cloud developer environment exclusive to a particular developer based on cloud resources identified by the particular developer. Processor hosts the user specific native cloud developer environment onto a cloud, so that the user specific native cloud developer environment and the cloud run in the same environment; writes code for developing the cloud application in an integrated development environment within the user specific native cloud developer environment that has been provisioned; automatically determines whether the code is working in the integrated development environment as well as in a cloud development environment within the cloud; and completes development of the cloud application based on determining that the code is working in the integrated development environment as well as in the cloud development environment.

20 Claims, 7 Drawing Sheets

SYSTEM, METHOD, AND COMPUTER PROGRAM FOR IMPLEMENTING A CLOUD HOSTED DEVELOPMENT MODULE

TECHNICAL FIELD

This disclosure generally relates to cloud application development, and, more particularly, to methods and apparatuses for implementing a platform, language, cloud, and database agnostic cloud hosted development module configured to generate a cloud hosted native environment exclusively for each developer, allowing them to write, test, and debug their code in one place.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Typically, there appears to be three main functions that developers perform when writing public cloud applications, i.e., provisioning public cloud resources, writing code, and waiting for deployment to public cloud development environment. Provisioning public could resources may include all activities related to provisioning public cloud services and infrastructure, for example writing Terraform code. Writing application code may correspond to the time spent in an Integrated Development Environment (IDE) building features, primarily writing, validating, and debugging code. Waiting for deployment to public cloud development environment may correspond to the time spent waiting for code to be pushed to the public cloud so the developer may confirm it works as expected. In many cases this may be in-flight code that the developer will continue working on rather than a complete feature that is ready to be pushed to subsequent environments.

However, writing application code for cloud is currently inefficient. The fundamental issue may be that the environment a developer writes his/her code in may not be the same as the environment the developer runs his/her code in. For example, the developer may provision his/her public cloud resources in one environment and may write code in another environment that may be unable to access the resources the developer have provisioned. Which means, the developer loses the ability to validate and debug code in real-time. For example, to validate code, the developer may need to push to the public cloud environment using a Continuous Integration/Continuous Deployment (CI/CD) pipeline which may take time and encourage the developer to validate less frequently, resulting in delays identifying and fixing bugs. This may prove to be extremely challenging to write, test, and debug code in the IDE. For example, the developer may lose native IDE debugging capability, and therefore, may need to interpret application logs rather than stepping through and inspecting code to find elusive bugs.

Therefore, today a developer may have the following options. First, the developer may write code, while in the IDE, without even attempting to validate the code against the public cloud resources. The developer simply hopes that it may work which may prove to be not ideal at all. Second, the developer may utilize a similar technology locally that is similar to the public cloud resource the developer has provisioned. For example, if the developer is using in-memory data store and cache service of a public cloud, he/she may use a distributed database locally. Although this may work, but is not truly representative and could result in subtle bugs. It may also require every developer in the team to perform additional installation and configuration locally which may prove to be extremely inefficient. It may also be inefficient when new joiners arrive and invariably results in inconsistent environments across the team. Third, the developer may punch security holes to make public cloud development resources accessible on-premises. Although this may be possible, but only for some public cloud resources and there may be some certification questions to answer. Even then, the resources may not be exclusive to the developer; there may be resource contention with other members of the developer's team. For example, if someone is testing at the same time the developer is debugging, the developer could negatively impact each other. Thus, the developer may need to wait for other developers to vacate the environment before the developer can validate his/her code. Clearly, this may not be an ideal scenario either.

Thus, there is a need for an advanced tool that can address these conventional shortcomings corresponding to application development and testing.

SUMMARY

The present disclosure, through one or more of its various aspects, embodiments, and/or specific features or sub-components, provides, among other features, various systems, servers, devices, methods, media, programs, and platforms for implementing a platform, language, cloud, and database agnostic cloud hosted development module configured to generate a cloud hosted native environment (i.e., Linux environment) exclusively for each developer, allowing them to write, test, and debug their code in one place, i.e., allowing dynamically and instantly provision native public cloud development environments in the cloud which support writing and debugging code in the same environments, all accessible through a browser, but the disclosure is not limited thereto.

For example, the present disclosure, through one or more of its various aspects, embodiments, and/or specific features or sub-components, provides, among other features, various systems, servers, devices, methods, media, programs, and platforms for implementing a platform, language, database, and cloud agnostic cloud hosted development module configured to provide the following technological improvements and benefits, but the disclosure is not limited thereto: reduced feedback loop to validate code from minutes to seconds; improved developer experience—debug code natively in the IDE; reduce time to provision development environments from days to minutes; consistent, reproducible, secure development environments; improved hygiene—automatically deployed environments on a regular cadence, ensuring vulnerabilities are regularly patched; remove resource contention by providing exclusive environments for each developer, etc.

For example, the cloud hosted development module may also provide a native Linux developer environment. Developing on the same Operating System (OS) as a target environment has many benefits, especially for those compiling to the OS (C++, C), but even Java or Python developers who are using OS libraries (for example, working with file system) will come across subtle bugs when developing in Windows and deploying to Linux.

According to exemplary embodiments, the cloud hosted development module may be configured to provide: a zero-install model with no local infrastructure requirements— everything can be accessible from the browser; ease of onboarding new developers—instant developer environments on demand; consistent and reproducible team developer environments; controlled and secure environments—no ability to install unapproved packages; and environment issues identified at development time, etc., but the disclosure is not limited thereto. That is, external dependencies, especially on-premises dependencies that are not accessible, are identified earlier in the process (as the developer is writing code) which allows the developer to mitigate sooner rather than having to wait until the code is written and deployed. Knowing these issues sooner can influence architectural decisions early before too much code is written.

According to exemplary embodiments, a method for developing a cloud application by utilizing one or more processors along with allocated memory is disclosed. The method may include: launching a user specific native cloud developer environment by utilizing a user interface; identifying which cloud resources are needed to provision the user specific native cloud developer environment for a particular developer of the cloud application; automatically provisioning the user specific native cloud developer environment exclusive to said particular developer based on the identified cloud resources; hosting the user specific native cloud developer environment onto a cloud, so that the user specific native cloud developer environment and the cloud run in the same environment; writing code for developing the cloud application in an integrated development environment within the user specific native cloud developer environment that has been provisioned; automatically determining whether the code is working in the integrated development environment as well as in a cloud development environment within the cloud; and completing development of the cloud application based on determining that the code is working in the integrated development environment as well as in the cloud development environment.

According to exemplary embodiments, the method may further include: provisioning the user specific native cloud developer environment in the cloud dynamically and instantly; writing and debugging code for developing the cloud application in the same user specific native cloud developer environment, all accessible through the user interface; and validating code by providing real-time feedback within the integrated development environment.

According to exemplary embodiments, the method may further include: asynchronously provisioning the user specific native cloud developer environment exclusive to said particular developer; and automatically transmitting an electronic mail to said particular developer once the provisioning is completed, wherein the electronic mail includes a uniform resource locator link to said user specific native cloud developer environment.

According to exemplary embodiments, the method may further include: establishing a connection to the user specific native cloud developer environment via the uniform resource locator link through the user interface; and cloning corresponding source code repository in connection with said particular developer to pull down project source code for developing the cloud application.

According to exemplary embodiments, the method may further include: invoking corresponding provisioning application programming interface to automatically provision the user specific native cloud developer environment exclusive to said particular developer based on the identified cloud resources.

According to exemplary embodiments, the cloud may be a public cloud.

According to exemplary embodiments, the cloud may be a private cloud.

According to exemplary embodiments, the method may further include: provisioning the user specific native cloud developer environment for each developer in a multi-tenant configuration as a dedicated environment such that developers can spin up or tear down the dedicated environment on demand.

According to exemplary embodiments, the method may further include: hosting the user specific native cloud developer environment onto the cloud in a manner such that the developers can access cloud services and resources directly, wherein there is no contention for resources because each developer gets a dedicated environment.

According to exemplary embodiments, a system for developing a cloud application is disclosed. The system may include: a processor; and a memory operatively connected to the processor via a communication interface, the memory storing computer readable instructions, when executed, may cause the processor to: launch a user specific native cloud developer environment by utilizing a user interface; identify which cloud resources are needed to provision the user specific native cloud developer environment for a particular developer of the cloud application; automatically provision the user specific native cloud developer environment exclusive to said particular developer based on the identified cloud resources; host the user specific native cloud developer environment onto a cloud, so that the user specific native cloud developer environment and the cloud run in the same environment; write code for developing the cloud application in an integrated development environment within the user specific native cloud developer environment that has been provisioned; automatically determine whether the code is working in the integrated development environment as well as in a cloud development environment within the cloud; and complete development of the cloud application based on determining that the code is working in the integrated development environment as well as in the cloud development environment.

According to exemplary embodiments, the processor may be further configured to: provision the user specific native cloud developer environment in the cloud dynamically and instantly; write and debug code for developing the cloud application in the same user specific native cloud developer environment, all accessible through the user interface; and validate code by providing real-time feedback within the integrated development environment.

According to exemplary embodiments, the processor may be further configured to: asynchronously provision the user specific native cloud developer environment exclusive to said particular developer; and automatically transmit an electronic mail to said particular developer once the provisioning is completed, wherein the electronic mail includes a uniform resource locator link to said user specific native cloud developer environment.

According to exemplary embodiments, the processor may be further configured to: establish a connection to the user specific native cloud developer environment via the uniform resource locator link through the user interface; and clone corresponding source code repository in connection with said particular developer to pull down project source code for developing the cloud application.

According to exemplary embodiments, the processor may be further configured to: invoke corresponding provisioning application programming interface to automatically provision the user specific native cloud developer environment exclusive to said particular developer based on the identified cloud resources.

According to exemplary embodiments, the processor may be further configured to: provision the user specific native cloud developer environment for each developer in a multi-tenant configuration as a dedicated environment such that developers can spin up or tear down the dedicated environment on demand.

According to exemplary embodiments, the processor may be further configured to: host the user specific native cloud developer environment onto the cloud in a manner such that the developers can access cloud services and resources directly, wherein there is no contention for resources because each developer gets a dedicated environment.

According to exemplary embodiments, a non-transitory computer readable medium configured to store instructions for developing a cloud application is disclosed. The instructions, when executed, may cause a processor to perform the following: launching a user specific native cloud developer environment by utilizing a user interface; identifying which cloud resources are needed to provision the user specific native cloud developer environment for a particular developer of the cloud application; automatically provisioning the user specific native cloud developer environment exclusive to said particular developer based on the identified cloud resources; hosting the user specific native cloud developer environment onto a cloud, so that the user specific native cloud developer environment and the cloud run in the same environment; writing code for developing the cloud application in an integrated development environment within the user specific native cloud developer environment that has been provisioned; automatically determining whether the code is working in the integrated development environment as well as in a cloud development environment within the cloud; and completing development of the cloud application based on determining that the code is working in the integrated development environment as well as in the cloud development environment.

According to exemplary embodiments, the instructions, when executed, may cause the processor to further perform the following: provisioning the user specific native cloud developer environment in the cloud dynamically and instantly; writing and debugging code for developing the cloud application in the same user specific native cloud developer environment, all accessible through the user interface; and validating code by providing real-time feedback within the integrated development environment.

According to exemplary embodiments, the instructions, when executed, may cause the processor to further perform the following: asynchronously provisioning the user specific native cloud developer environment exclusive to said particular developer; and automatically transmitting an electronic mail to said particular developer once the provisioning is completed, wherein the electronic mail includes a uniform resource locator link to said user specific native cloud developer environment.

According to exemplary embodiments, the instructions, when executed, may cause the processor to further perform the following; establishing a connection to the user specific native cloud developer environment via the uniform resource locator link through the user interface; and cloning corresponding source code repository in connection with said particular developer to pull down project source code for developing the cloud application.

According to exemplary embodiments, the instructions, when executed, may cause the processor to further perform the following: invoking corresponding provisioning application programming interface to automatically provision the user specific native cloud developer environment exclusive to said particular developer based on the identified cloud resources.

According to exemplary embodiments, the instructions, when executed, may cause the processor to further perform the following: provisioning the user specific native cloud developer environment for each developer in a multi-tenant configuration as a dedicated environment such that developers can spin up or tear down the dedicated environment on demand.

According to exemplary embodiments, the instructions, when executed, may cause the processor to further perform the following: hosting the user specific native cloud developer environment onto the cloud in a manner such that the developers can access cloud services and resources directly, wherein there is no contention for resources because each developer gets a dedicated environment.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
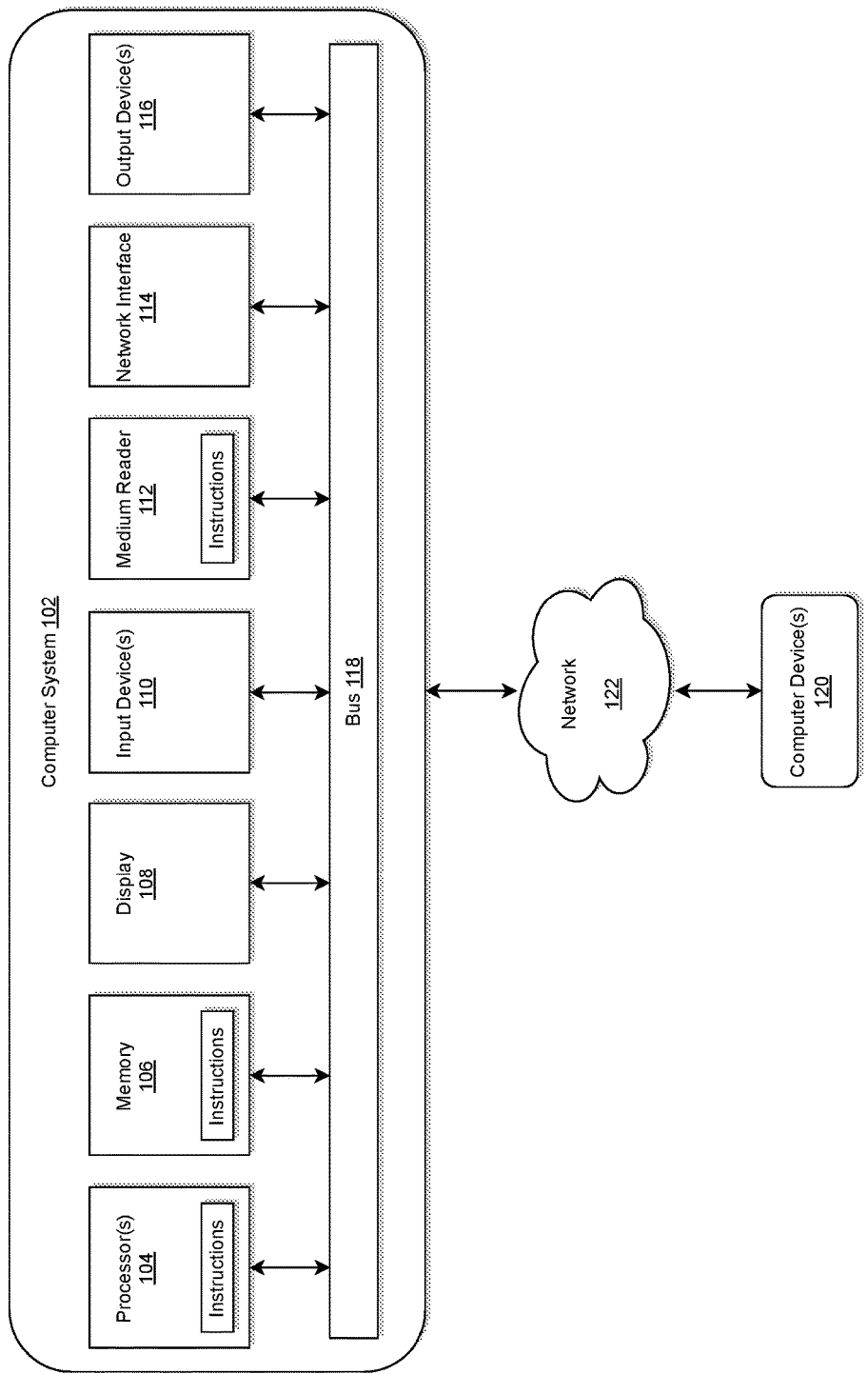
FIG. 1 illustrates a computer system for implementing a platform, language, database, and cloud agnostic cloud hosted development module configured to generate a cloud hosted native environment exclusively for each developer in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform, language, database, and cloud agnostic cloud hosted development module configured to generate a cloud hosted native environment exclusively for each developer in accordance with an exemplary embodiment. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the cloud hosted development module may be platform, language, database, and cloud agnostic that may allow for consistent easy orchestration and passing of data through various components to output a desired result regardless of platform, language, database, and cloud environment. Since the disclosed process, according to exemplary embodiments, is platform, language, database, and cloud agnostic, the cloud hosted development module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
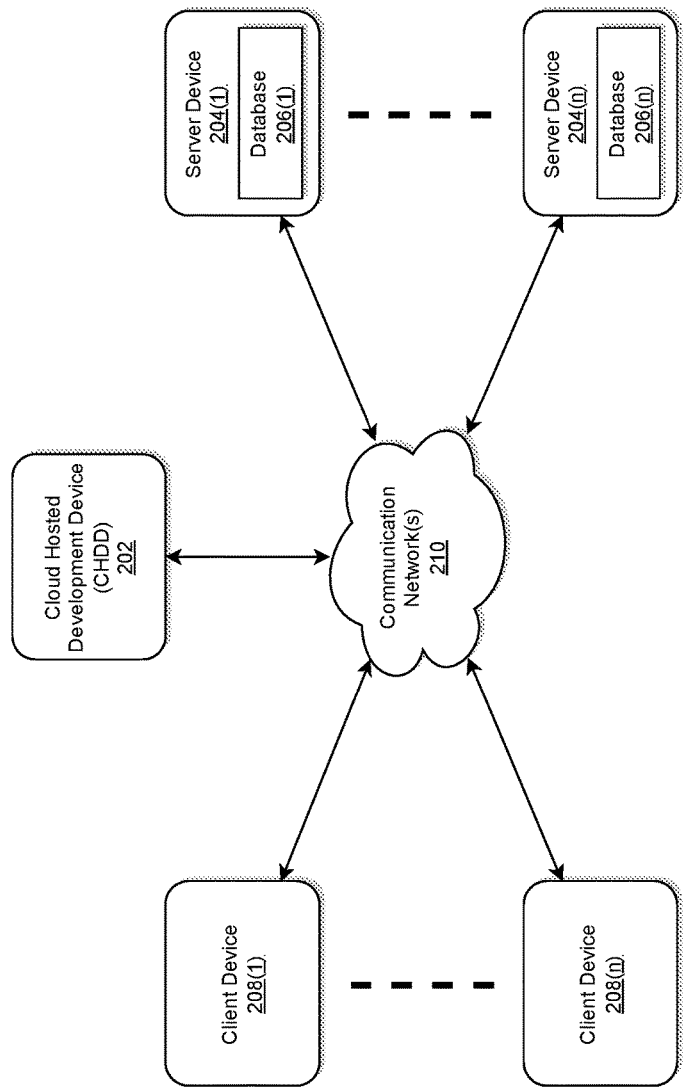
FIG. 2 illustrates an exemplary diagram of a network environment with a platform, language, database, and cloud agnostic cloud hosted development device in accordance with an exemplary embodiment.

Referring to FIG. 2, a schematic of an exemplary network environment 200 for implementing a language, platform, database, and cloud agnostic cloud hosted development device (CHDD) of the instant disclosure is illustrated.

According to exemplary embodiments, the above-described problems associated with conventional tools may be overcome by implementing an CHDD 202 as illustrated in FIG. 2 that may be configured for implementing a platform, language, database, and cloud agnostic cloud hosted development module configured to generate a cloud hosted native environment (i.e., Linux environment) exclusively for each developer, allowing them to write, test, and debug their code in one place, i.e., allowing dynamically and instantly provision native public cloud development environments in the cloud which support writing and debugging code in the same environments, all accessible through a browser, but the disclosure is not limited thereto.

The CHDD 202 may be the same or similar to the computer system 102 as described with respect to FIG. 1.

The CHDD 202 may store one or more applications that can include executable instructions that, when executed by the CHDD 202, cause the CHDD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CHDD 202 itself, may be located in virtual server(s) running in a cloud-based computing environment rather than being tied to one or more specific physical network computing devices. Also, the application(s) may be running in one or more virtual machines (VMs) executing on the CHDD 202. Additionally, in one or more embodiments of this technology, virtual machine(s) running on the CHDD 202 may be managed or supervised by a hypervisor.

In the network environment 200 of FIG. 2, the CHDD 202 is coupled to a plurality of server devices 204(1)-204(n) that hosts a plurality of databases 206(1)-206(n), and also to a plurality of client devices 208(1)-208(n) via communication network(s) 210. A communication interface of the CHDD 202, such as the network interface 114 of the computer system 102 of FIG. 1, operatively couples and communicates between the CHDD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CHDD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CHDD 202 may be a standalone device or integrated with one or more other devices or apparatuses, such as one or more of the server devices 204(1)-204(n), for example. In one particular example, the CHDD 202 may be hosted by one of the server devices 204(1)-204(n), and other arrangements are also possible. Moreover, one or more of the devices of the CHDD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the CHDD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the CHDD 202 that may efficiently provide a platform for implementing a platform, language, database, and cloud agnostic cloud hosted development module configured to generate a cloud hosted native environment (i.e., Linux environment) exclusively for each developer, allowing them to write, test, and debug their code in one place, i.e., allowing dynamically and instantly provision native public cloud development environments in the cloud which support writing and debugging code in the same environments, all accessible through a browser, but the disclosure is not limited thereto.

The client devices 208(1)-208(n) may run interface applications, such as standard web browsers or standalone client applications, which may provide an interface to communicate with the CHDD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the CHDD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the CHDD 202, the server devices 204(1)-204(n), or the client devices 208(1)-208(n), for example, may be configured to operate as virtual instances on the same physical machine. For example, one or more of the CHDD 202, the server devices 204(1)-204(n), or the client devices 208(1)-208(n) may operate on the same physical device rather than as separate devices communicating through communication network(s) 210. Additionally, there may be more or fewer CHDDs 202, server devices 204(1)-204(n), or client devices 208(1)-208(n) than illustrated in FIG. 2. According to exemplary embodiments, the CHDD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
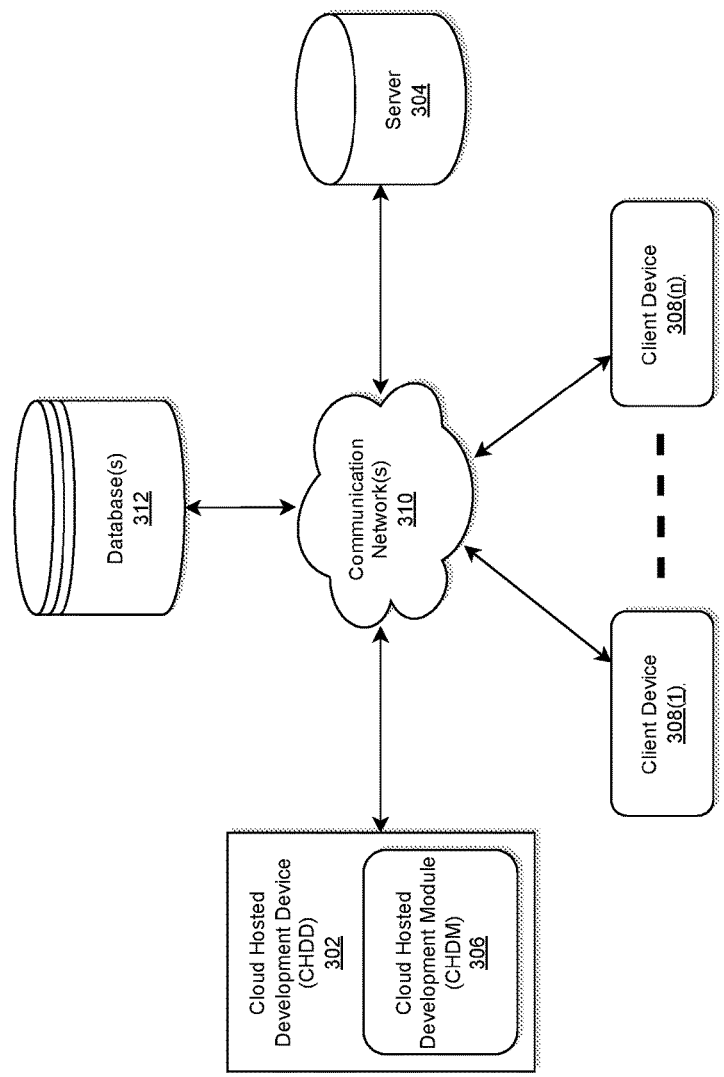
FIG. 3 illustrates a system diagram for implementing a platform, language, database, and cloud agnostic cloud hosted development device having a platform, language, database, and cloud agnostic cloud hosted development module in accordance with an exemplary embodiment.

FIG. 3 illustrates a system diagram for implementing a platform, language, and cloud agnostic CHDD having a platform, language, database, and cloud agnostic cloud hosted development module (CHDM) in accordance with an exemplary embodiment.

As illustrated in FIG. 3, the system 300 may include a CHDD 302 within which an CHDM 306 is embedded, a server 304, a database(s) 312, a plurality of client devices 308(1) . . . 308(n), and a communication network 310.

According to exemplary embodiments, the CHDD 302 including the CHDM 306 may be connected to the server 304, and the database(s) 312 via the communication network 310. The CHDD 302 may also be connected to the plurality of client devices 308(1) . . . 308(n) via the communication network 310, but the disclosure is not limited thereto.

According to exemplary embodiment, the CHDD 302 is described and shown in FIG. 3 as including the CHDM 306, although it may include other rules, policies, modules, databases, or applications, for example. According to exemplary embodiments, the database(s) 312 may be configured to store ready to use modules written for each Application Programming Interface (API) for all environments. Although only one database is illustrated in FIG. 3, the disclosure is not limited thereto. Any number of desired databases may be utilized for use in the disclosed invention herein. The database(s) may be a mainframe database, a log database that may produce programming for searching, monitoring, and analyzing machine-generated data via a web interface, etc., but the disclosure is not limited thereto.

According to exemplary embodiments, the CHDM 306 may be configured to receive real-time feed of data from the plurality of client devices 308(1) . . . 308(n) and secondary sources via the communication network 310.

As may be described below, the CHDM 306 may be configured to: launch a user specific native cloud developer environment by utilizing a user interface; identify which cloud resources are needed to provision the user specific native cloud developer environment for a particular developer of the cloud application; automatically provision the user specific native cloud developer environment exclusive to said particular developer based on the identified cloud resources; host the user specific native cloud developer environment onto a cloud, so that the user specific native cloud developer environment and the cloud run in the same environment; write code for developing the cloud application in an integrated development environment within the user specific native cloud developer environment that has been provisioned; automatically determine whether the code is working in the integrated development environment as well as in a cloud development environment within the cloud; and complete development of the cloud application based on determining that the code is working in the integrated development environment as well as in the cloud development environment, but the disclosure is not limited thereto.

The plurality of client devices 308(1) . . . 308(n) are illustrated as being in communication with the CHDD 302. In this regard, the plurality of client devices 308(1) . . . 308(n) may be "clients" (e.g., customers) of the CHDD 302 and are described herein as such. Nevertheless, it is to be known and understood that the plurality of client devices 308(1) . . . 308(n) need not necessarily be "clients" of the CHDD 302, or any entity described in association therewith herein. Any additional or alternative relationship may exist between either or both of the plurality of client devices 308(1) . . . 308(n) and the CHDD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the CHDD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The CHDD 302 may be the same or similar to the CHDD 202 as described with respect to FIG. 2, including any features or combination of features described with respect thereto.

Figure 4:
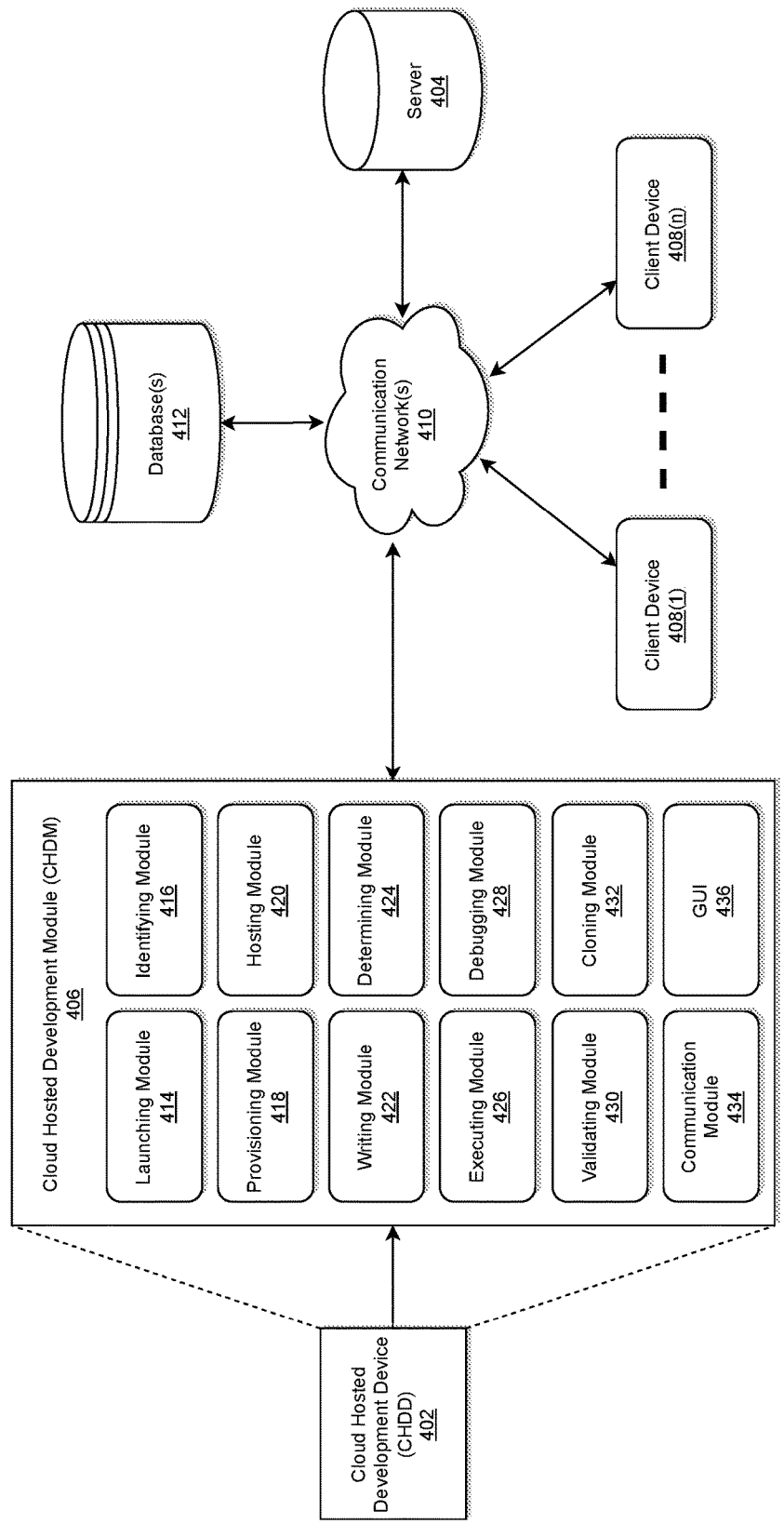
FIG. 4 illustrates a system diagram for implementing a platform, language, database, and cloud agnostic cloud hosted development module of FIG. 3 in accordance with an exemplary embodiment.

FIG. 4 illustrates a system diagram for implementing a platform, language, database, and cloud agnostic CHDM of FIG. 3 in accordance with an exemplary embodiment.

According to exemplary embodiments, the system 400 may include a platform, language, database, and cloud agnostic CHDD 402 within which a platform, language, database, and cloud agnostic CHDM 406 is embedded, a server 404, database(s) 412, and a communication network 410. According to exemplary embodiments, server 404 may comprise a plurality of servers located centrally or located in different locations, but the disclosure is not limited thereto.

According to exemplary embodiments, the CHDD 402 including the CHDM 406 may be connected to the server 404 and the database(s) 412 via the communication network 410. The CHDD 402 may also be connected to the plurality of client devices 408(1)-408(n) via the communication network 410, but the disclosure is not limited thereto. The CHDM 406, the server 404, the plurality of client devices 408(1)-408(n), the database(s) 412, the communication network 410 as illustrated in FIG. 4 may be the same or similar to the CHDM 306, the server 304, the plurality of client devices 308(1)-308(n), the database(s) 312, the communication network 310, respectively, as illustrated in FIG. 3.

According to exemplary embodiments, as illustrated in FIG. 4, the CHDM 406 may include a launching module 414, an identifying module 416, a provisioning module 418, a hosting module 420, a writing module 422, a determining module 424, an executing module 426, a debugging module 428, a validating module 430, a cloning module 432, a communication module 434, and a GUI 436. According to exemplary embodiments, interactions and data exchange among these modules included in the CHDM 406 provide the advantageous effects of the disclosed invention. Functionalities of each module of FIG. 4 may be described in detail below with reference to FIGS. 4-7.

According to exemplary embodiments, each of the launching module 414, identifying module 416, provisioning module 418, hosting module 420, writing module 422, determining module 424, executing module 426, debugging module 428, validating module 430, cloning module 432, and the communication module 434 of the CHDM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the launching module 414, identifying module 416, provisioning module 418, hosting module 420, writing module 422, determining module 424, executing module 426, debugging module 428, validating module 430, cloning module 432, and the communication module 434 of the CHDM 406 of FIG. 4 may be implemented by microprocessors or similar, and may be programmed using software (e.g., microcode) to perform various functions discussed herein and may optionally be driven by firmware and/or software.

Alternatively, according to exemplary embodiments, each of the launching module 414, identifying module 416, provisioning module 418, hosting module 420, writing module 422, determining module 424, executing module 426, debugging module 428, validating module 430, cloning module 432, and the communication module 434 of the CHDM 406 of FIG. 4 may be implemented by dedicated hardware, or as a combination of dedicated hardware to perform some functions and a processor (e.g., one or more programmed microprocessors and associated circuitry) to perform other functions.

According to exemplary embodiments, each of the launching module 414, identifying module 416, provisioning module 418, hosting module 420, writing module 422, determining module 424, executing module 426, debugging module 428, validating module 430, cloning module 432, and the communication module 434 of the CHDM 406 of FIG. 4 may be called via corresponding API.

According to exemplary embodiments, the process implemented by the CHDM 406 may be executed via the communication module 434 and the communication network 410, which may comprise plural networks as described above. For example, in an exemplary embodiment, the various components of the CHDM 406 may communicate with the server 404, and the database(s) 412 via the communication module 434 and the communication network 410 and the results may be displayed onto the GUI 436. Of course, these embodiments are merely exemplary and are not limiting or exhaustive. The database(s) 412 may include the databases included within the private cloud and/or public cloud and the server 404 may include one or more servers within the private cloud and the public cloud.

According to exemplary embodiments, the launching module may be configured to launch a user specific native cloud developer environment by utilizing the GUI 436. The identifying module 416 may be configured to identify which cloud resources are needed to provision the user specific native cloud developer environment for a particular developer of the cloud application. The provisioning module may be configured to automatically provision the user specific native cloud developer environment exclusive to the particular developer based on the identified cloud resources. The hosting module 420 may be configured to host the user specific native cloud developer environment onto a cloud, so that the user specific native cloud developer environment and the cloud run in the same environment.

According to exemplary embodiments, the writing module 422 may be configured to allow the user (i.e., developer) to write code for developing the cloud application in an integrated development environment within the user specific native cloud developer environment that has been provisioned. The determining module 424 may be configured to automatically determine whether the code is working in the integrated development environment as well as in a cloud development environment within the cloud. The executing module 426 may be configured to complete development of the cloud application based on determining that the code is working in the integrated development environment as well as in the cloud development environment.

According to exemplary embodiments, the provisioning module 418 may be further configured to provision the user specific native cloud developer environment in the cloud dynamically and instantly. The writing module 422 may be configured to allow the user to write and debug code, by utilizing the debugging module 428, for developing the cloud application in the same user specific native cloud developer environment, all accessible through the GUI 436. The validating module 430 may be configured to validate the code by providing real-time feedback within the integrated development environment.

According to exemplary embodiments, the provisioning module 418 may be further configured to asynchronously provision the user specific native cloud developer environment exclusive to the particular developer; and the communication module 434 may be configured to automatically transmit an electronic mail to the particular developer once the provisioning is completed. The electronic mail includes a uniform resource locator (URL) link to the user specific native cloud developer environment.

According to exemplary embodiments, the communication module 434 may be further configured to establish a connection to the user specific native cloud developer environment via the URL link through the user interface; and cloning module 432 may be configured to clone corresponding source code repository in connection with particular developer to pull down project source code for developing the cloud application.

According to exemplary embodiments, the provisioning module 418 may be further configured to invoke corresponding provisioning application programming interface to automatically provision the user specific native cloud developer environment exclusive to the particular developer based on the identified cloud resources.

According to exemplary embodiments, the provisioning module 418 may be further configured to provision the user specific native cloud developer environment for each developer in a multi-tenant configuration as a dedicated environment such that developers can spin up or tear down the dedicated environment on demand.

According to exemplary embodiments, the hosting module 420 may be further configured to host the user specific native cloud developer environment onto the cloud in a manner such that the developers can access cloud services and resources directly, wherein there is no contention for resources because each developer gets a dedicated environment. According to exemplary embodiments, the cloud may be a public cloud and/or a private cloud, but the disclosure is not limited thereto.

Figure 5:
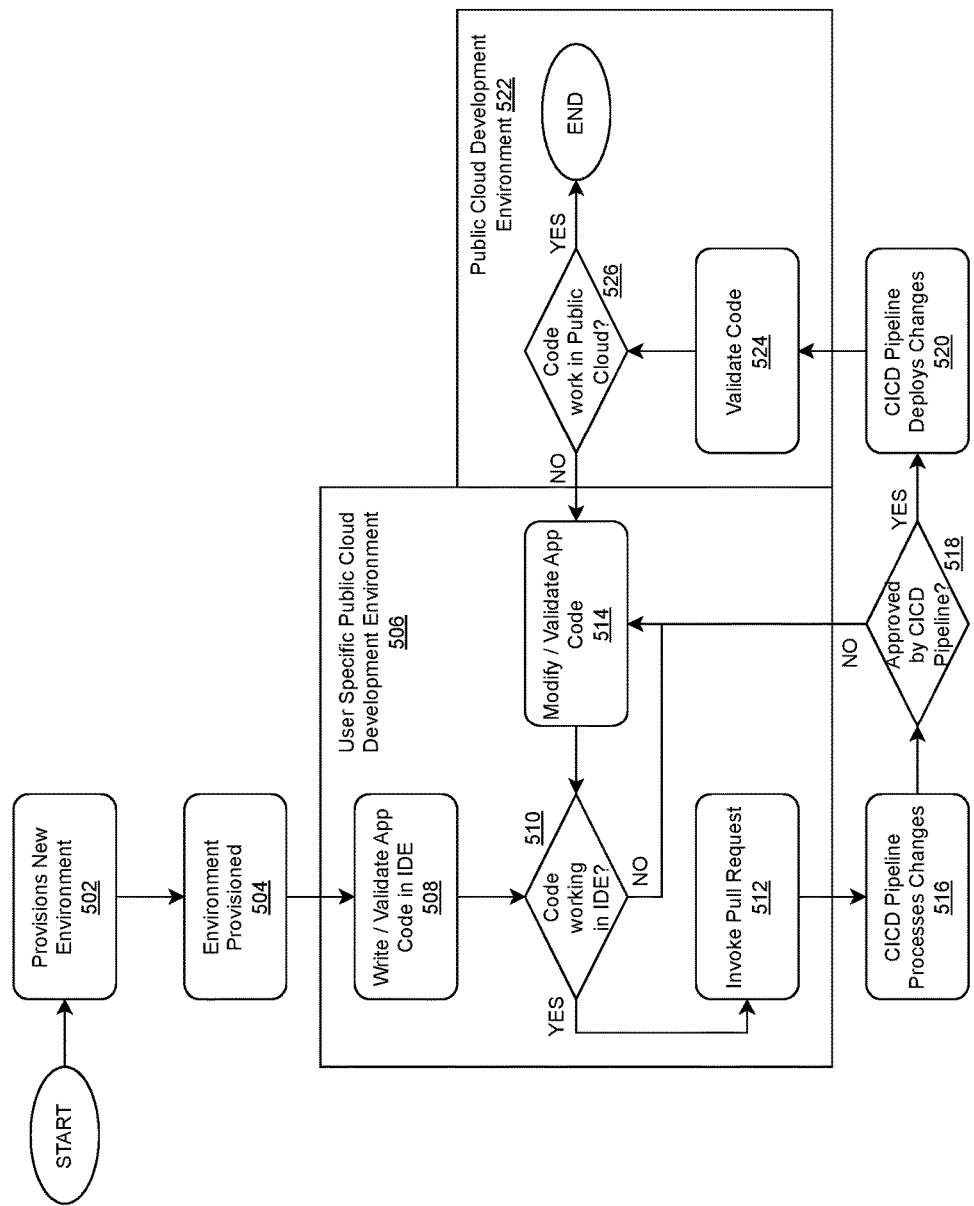
FIG. 5 illustrates an exemplary flow chart of a process as implemented by the platform, language, database, and cloud agnostic cloud hosted development module of FIG. 4 in accordance with an exemplary embodiment.

For example, FIG. 5 illustrates an exemplary flow chart of a process 500 as implemented by the platform, language, database, and cloud agnostic CHDM 406 of FIG. 4 in accordance with an exemplary embodiment.

Referring to both FIGS. 4 and 5, as illustrated in FIG. 5, the process 500 may include step 502 where, from within a developer control-plane (i.e., the GUI 436 as illustrated in FIG. 4), the developer launches a new developer environment using the CHDM 406, identifying which public cloud resources they would like to provision. Developers can have as many environments as they like for specific feature branches or projects they may be working on simultaneously. At step 504, the process 500 automatically provisions the exclusive developer environment, i.e., the user specific public cloud development environment 506, for that developer with the public cloud resources they have selected. This user specific public cloud development environment 506 is hosted in an open-source system of the public cloud for automating deployment, scaling, and management of containerized applications and is in essence a developer sandbox environment exclusive to that developer.

According to exemplary embodiments, provisioning of an environment takes place asynchronously, and the developer receives an automated email once complete with a URL to the environment. This provisioning action is performed only once per environment. At this point the developer would connect to the user specific public cloud development environment 506 through their browser, then clone their source code repository to pull down the project source code.

According to exemplary embodiments, at step 508, the developer may now start writing application code in an IDE that has been provisioned for them. This IDE runs in the provisioned user specific public cloud development environment 506 in public cloud and is accessible from their browser. That is, all public cloud resources provisioned by the developer are accessible and they can immediately start writing code against them without having to push anything yet through the CI/CD pipeline, at this point of time until it is determined that that code is working properly in the IDE. The developer can set breakpoints and debug and inspect code within their IDE—thereby providing a typical developer experience with an instant feedback loop.

According to exemplary embodiments, at step 510, a determining is made whether this code is working in the IDE. At step 514, the developer receives an instant feedback and modifies the code accordingly when it is determined in step 510 that the code is not working in IDE.

According to exemplary embodiments, when it is determined in step 510 that the code is working in the IDE, at step 512, the developer can initiate a pull request by invoking corresponding pull request. This pull request invokes the CICD pipeline. At step 516, the CICD pipeline processes all changes to the code, if any. At step 518, a determination is made whether the processed code is approved by the CICD pipeline. When it is determined at step 518 that the processed code is not approved (very rare scenario) in the CICD pipeline, at step 514, the developer is given another opportunity to modify and validate the code and the process 500 proceeds to step 510 again.

According to exemplary embodiments, when it is determined at step 518 that the processed code is approved in the CICD pipeline, at step 520, all approved changes of the processed code is deployed and pushed to the public cloud development environment 522 associated with the application under development. By implementing this process, developers' confidence level should be very high because while in their IDE they have been validating their code against "the real thing" at step 518 since both the user specific public cloud development environment 506 and the public cloud development environment are hosted in the same cloud (i.e., in the same public cloud). Thus, the number of pushes through the CI/CD pipeline would be significantly reduced because the developers are able to fully validate their code before pushing. CI/CD pipeline is invoked purely for deployment, and not to debug code. Thus, at step 524, processed code approved by the CI/CD pipeline is validated in the public cloud development environment 522 for deployment of the cloud application developed by the developer. For example, at step 526, a determination is made whether the processed code approved by the CI/CD pipeline is working in the public cloud. When it is determined at step 526 that the processed code approved by the CI/CD pipeline is not working in the public cloud, the developed application is rejected for deployment and the process 500 proceeds to step 514 so that the developer can modify and validate and rejected codes. When it is determined at step 526 that the processed code approved by the CI/CD pipeline is working in the public cloud, the developed application is proceed to deployment and the process 500 ends.

According to exemplary embodiments, when users (i.e., developers) provisions resources within a given public cloud account, they can be accessed across that account. Thus, there can be multiple developers working in any given public cloud account. Thus, the CHDM 406 ensures that the resources provisioned are exclusively available to the developer who provisioned them. The CHDM 406 may configured to achieve this through the use of roles, i.e., public cloud Identity and Access Management (JAM) roles. For example, at provision time the developer may be allocated to an IAM role, and all resources provisioned may also be allocated to the same IAM role. That is, only that developer may be able to see those resources, in essence creating a developer sandbox in a multi-tenant environment.

Figure 6:
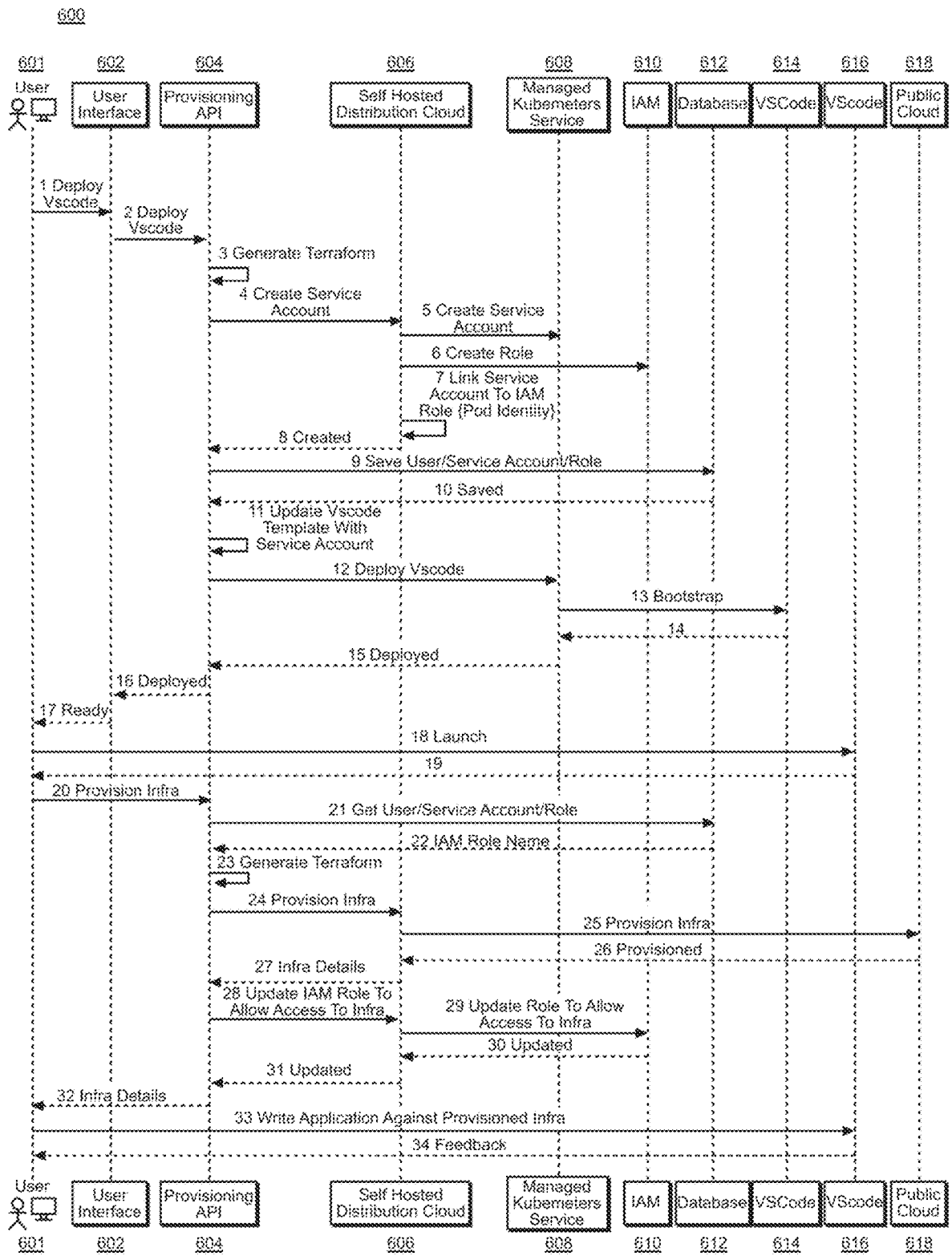
FIG. 6 illustrates an exemplary sequence diagram implemented by the platform, language, database, and cloud agnostic cloud hosted development module of FIG. 4 in accordance with an exemplary embodiment.

For example, FIG. 6 illustrates an exemplary sequence diagram 600 implemented by the platform, language, database, and cloud agnostic CHDM 406 of FIG. 4 in accordance with an exemplary embodiment.

As illustrated in FIG. 6, the sequence diagram 600 includes a user interface (i.e., GUI 436 as illustrate din FIG. 4), provisioning API 604, self-hosted distribution cloud 606 (i.e., Terraform Enterprise (TFE)), managed Kubernetes service 608 (i.e., an open-source system for automating deployment, scaling, and management of containerized applications), IAM 610, database 612, Visual Studio Code, i.e., VS Code 614 and VScode 616, and a public cloud 618, but the disclosure is not limited thereto.

For example, at sequence 1 of the sequence diagram 600, a suer 601 may deploy code (i.e., Visual Studio Code) utilizing the user interface 602. At sequence 2, the user interface 602 deploys the code to the provisioning API 604. Accordingly, the provisioning API 604 generates Terraform so the user 601 may define and provide data center infrastructure using a declarative configuration language. At sequence 4, a service account is created for the user 601 in the self-hosted distribution could 606. At sequence 5, a service account is created for the user 601 in the managed Kubernetes service based on the created self-hosted distributed cloud service account. In addition, at sequence 6, an IAM role is created for the user 601 by utilizing the IAM 610 corresponding to the created self-hosted distributed cloud service account. In response, at sequence 7, the created self-hosted distributed cloud service account is linked to the corresponding IAM role. At sequence 8, the created link is sent to the provisioning API 604. In response, at sequence 9, the service account and corresponding IAM role are saved onto the database 612. At sequence 10, the saved service account and corresponding IAM role are sent to the provisioning API 604. In response, at sequence 11, the provisioning API 604 updates the code template, i.e., the VS Code template) with the service account.

According to exemplary embodiments, at sequence 12, the VS code is deployed in the managed Kubernetes service 608. At sequence 13, the managed Kubernetes service 608 utilizes Bootstrap framework to obtain information corresponding to interface or infrastructure components based on the VS Code 614. Bootstrap is a free and open-source CSS framework directed at responsive, mobile-first front-end web development. It contains HTML, CSS and JavaScript-based design templates for typography, forms, buttons, navigation, and other interface or infrastructure components. At sequence 14, the VS Code 614 for corresponding interface or infrastructure components are sent back to the managed Kubernetes service 608.

According to exemplary embodiments, at sequence 15, the VS Code 614 is deployed for the provisioning API 604, and in turn, at sequence 16, deployed for the user interface 602. At sequence 17, the user 601 receives a notification that the user interface is ready for provisioning new environment dedicated to the user 601. Thus, at sequence 18, the user 601 launches for provisioning new environment, and in response, at sequence 19, the VScode 616 is sent to the user 601. At sequence 20, the user 601 provisions infrastructure based on provisioning API 604. In response, at sequence 21, the provisioning API 604 sends a request to obtain the stored user's service account and corresponding IAM role from the database 612. In response, at sequence 22, the user's service account and corresponding IAM role name is sent back to the provisioning API 604 from the database 612.

According to exemplary embodiments, based on the user's service account and corresponding IAM role name, at sequence 23, Terraform is generated. At sequence 24, a request is sent to the self-hosted distribution cloud 606 to provision infrastructure based on the generated Terraform. At sequence 25, the self-hosted distribution cloud 606 hosts the infrastructure onto the public cloud 618 for provisioning. At sequence 26, the public cloud 618 sends a notification to the self-hosted distribution cloud 606 that the infrastructure has been provisioned. At sequence 27, the self-hosted distribution cloud 606 sends the infrastructure details to the provisioning API 604. At sequence 28, IAM role is updated at the self-hosted distribution cloud 606 to allow the user 601 to have access to the infrastructure.

Accordingly, at sequence 29, the corresponding IAM role is updated at the IAM 610 to allow the user 601 to have access to the infrastructure. At sequence 30, a notification is sent from the IAM 610 to the self-hosted distribution cloud 606 that the IAM role has been updated. At sequence 31, a notification is sent from the self-hosted distribution cloud 606 to the provisioning API 604 that the IAM role has been updated. Accordingly, at sequence 32, infrastructure details are sent from the provisioning API 604 to the suer 601. At sequence 33, the user 601 may write an application against the provisioned infrastructure based on the VScode 616, and at sequence 34, the user 601 obtains instant feedback on associated codes prior to deploying the application.

According to exemplary embodiments, by implementing the above sequence diagram 600 as illustrated in FIG. 6, the CHDM 406 is configured in a manner to provide the following technological improvements and benefits, but the disclosure is not limited thereto: reduced feedback loop to validate code from minutes to seconds; improved developer experience—debug code natively in the IDE; reduce time to provision development environments from days to minutes; consistent, reproducible, secure development environments; improved hygiene—automatically deployed environments on a regular cadence, ensuring vulnerabilities are regularly patched; remove resource contention by providing exclusive environments for each developer, etc. For example, the CHDM 406 may also provide a native Linux developer environment. Developing on the same Operating System (OS) as a target environment has many benefits, especially for those compiling to the OS (C++, C), but even Java or Python developers who are using OS libraries (for example, working with file system) will come across subtle bugs when developing in Windows and deploying to Linux.

According to exemplary embodiments, the CHDM 406 may also be configured to implement the sequence diagram 600 to provide: a zero-install model with no local infrastructure requirements—everything may be accessible from the browser; ease of onboarding new developers—instant developer environments on demand; consistent and reproducible team developer environments; controlled and secure environments—no ability to install unapproved packages; and environment issues identified at development time, etc., but the disclosure is not limited thereto. That is, external dependencies, especially on-premises dependencies that are not accessible, are identified earlier in the process (as the developer is writing code) which allows the developer to mitigate sooner rather than having to wait until the code is written and deployed. Knowing these issues sooner can influence architectural decisions early before too much code is written.

According to exemplary embodiments, the CHDM 406 may be configured to build an API to allow developers to provision their public cloud developer environments with public cloud resources. This API provisions fixed size, micro instances of public cloud resources—a one-size fits all model. When a developer provisions an environment, they can simply choose which public cloud resources they want to provision within it. The provisioning API (i.e., provisioning API 604 as illustrated in FIG. 6, then provisions the environments and resources asynchronously, then emails the developer with the URL to the environment when it is ready. For simplicity, an environment will be considered immutable once it is created. If a developer wants to add additional public cloud resources to an existing environment, they may need to spin up a new environment and dispose of the old one. This may require persistent storage so that developers do not lose any work.

According to exemplary embodiments, developers can have multiple concurrent environments, for example if they are working on more than one project, or from multiple feature branches in a single project. Each of these environments will be isolated from each other.

According to exemplary embodiments, the provisioning API 604 that provisions the cloud development environments as disclosed herein is stateless and is deployed as a Lambda running in public cloud, so it can dynamically scale up to support increases in volume. Once an environment has been provisioned, there is no runtime dependency on the cloud development itself. The environment is simply a pod hosted in EKS/ECS thereby configured for supporting thousands of concurrent developers.

Figure 7:
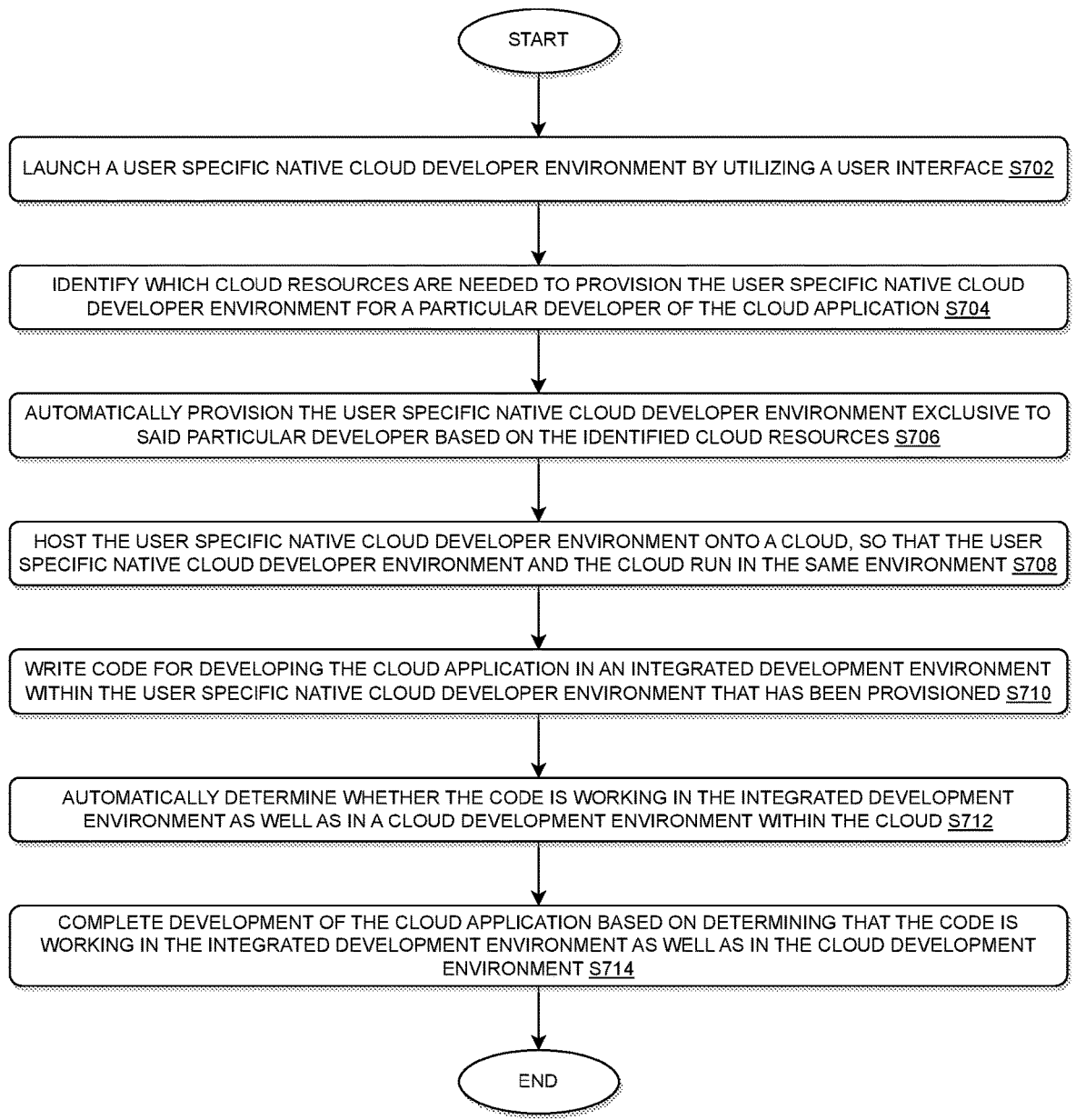
FIG. 7 illustrates an exemplary flow chart of a process implemented by the platform, language, database, and cloud agnostic cloud hosted development module of FIG. 4 for generating a cloud hosted native environment exclusively for each developer in accordance with an exemplary embodiment.

FIG. 7 illustrates an exemplary flow chart of a process 700 implemented by the platform, language, database, and cloud agnostic CHDM 406 of FIG. 4 for generating a cloud hosted native environment exclusively for each developer in accordance with an exemplary embodiment. It may be appreciated that the illustrated process 700 and associated steps may be performed in a different order, with illustrated steps omitted, with additional steps added, or with a combination of reordered, combined, omitted, or additional steps.

As illustrated in FIG. 7, at step S702, the process 700 may include launching a user specific native cloud developer environment by utilizing a user interface.

At step S704, the process 700 may include identifying which cloud resources are needed to provision the user specific native cloud developer environment for a particular developer of the cloud application.

At step S706, the process 700 may include automatically provisioning the user specific native cloud developer environment exclusive to the particular developer based on the identified cloud resources.

At step S708, the process 700 may include hosting the user specific native cloud developer environment onto a cloud, so that the user specific native cloud developer environment and the cloud run in the same environment.

At step S710, the process 700 may include writing code for developing the cloud application in an integrated development environment within the user specific native cloud developer environment that has been provisioned.

At step S712, the process 700 may include automatically determining whether the code is working in the integrated development environment as well as in a cloud development environment within the cloud.

At step S714, the process 700 may include completing development of the cloud application based on determining that the code is working in the integrated development environment as well as in the cloud development environment.

According to exemplary embodiments, the process 700 may further include: provisioning the user specific native cloud developer environment in the cloud dynamically and instantly; writing and debugging code for developing the cloud application in the same user specific native cloud developer environment, all accessible through the user interface; and validating code by providing real-time feedback within the integrated development environment.

According to exemplary embodiments, the process 700 may further include: asynchronously provisioning the user specific native cloud developer environment exclusive to said particular developer; and automatically transmitting an electronic mail to said particular developer once the provisioning is completed, wherein the electronic mail includes a uniform resource locator link to said user specific native cloud developer environment.

According to exemplary embodiments, the process 700 may further include; establishing a connection to the user specific native cloud developer environment via the uniform resource locator link through the user interface; and cloning corresponding source code repository in connection with said particular developer to pull down project source code for developing the cloud application.

According to exemplary embodiments, the process 700 may further include: invoking corresponding provisioning application programming interface to automatically provision the user specific native cloud developer environment exclusive to said particular developer based on the identified cloud resources.

According to exemplary embodiments, in the process 700, the cloud may be a public cloud and/or a public cloud.

According to exemplary embodiments, the process 700 may further include: provisioning the user specific native cloud developer environment for each developer in a multi-tenant configuration as a dedicated environment such that developers can spin up or tear down the dedicated environment on demand.

According to exemplary embodiments, the process 700 may further include: hosting the user specific native cloud developer environment onto the cloud in a manner such that the developers can access cloud services and resources directly, wherein there is no contention for resources because each developer gets a dedicated environment.

According to exemplary embodiments, the CHDD 402 may include a memory (e.g., a memory 106 as illustrated in FIG. 1) which may be a non-transitory computer readable medium that may be configured to store instructions for implementing a platform, language, database, and cloud agnostic CHDM 406 for developing a cloud application by utilizing a dedicated user specific cloud development environment hosted onto a public cloud as disclosed herein. The CHDD 402 may also include a medium reader (e.g., a medium reader 112 as illustrated in FIG. 1) which may be configured to read any one or more sets of instructions, e.g., software, from any of the memories described herein. The instructions, when executed by a processor embedded within the CHDM 406 or within the CHDD 402, may be used to perform one or more of the methods and processes as described herein. In a particular embodiment, the instructions may reside completely, or at least partially, within the memory 106, the medium reader 112, and/or the processor 104 (see FIG. 1) during execution by the CHDD 402.

According to exemplary embodiments, the instructions, when executed, may cause a processor embedded within the CHDM 406 or the CHDD 402 to perform the following: launching a user specific native cloud developer environment by utilizing a user interface; identifying which cloud resources are needed to provision the user specific native cloud developer environment for a particular developer of the cloud application; automatically provisioning the user specific native cloud developer environment exclusive to said particular developer based on the identified cloud resources; hosting the user specific native cloud developer environment onto a cloud, so that the user specific native cloud developer environment and the cloud run in the same environment; writing code for developing the cloud application in an integrated development environment within the user specific native cloud developer environment that has been provisioned; automatically determining whether the code is working in the integrated development environment as well as in a cloud development environment within the cloud; and completing development of the cloud application based on determining that the code is working in the integrated development environment as well as in the cloud development environment. According to exemplary embodiments, the processor may be the same or similar to the processor 104 as illustrated in FIG. 1 or the processor embedded within the CHDD 202, CHDD 302, CHDD 402, and CHDM 406 which is the same or similar to the processor 104.

According to exemplary embodiments, the instructions, when executed, may cause the processor to further perform the following: provisioning the user specific native cloud developer environment in the cloud dynamically and instantly; writing and debugging code for developing the cloud application in the same user specific native cloud developer environment, all accessible through the user interface; and validating code by providing real-time feedback within the integrated development environment.

According to exemplary embodiments, the instructions, when executed, may cause the processor to further perform the following: asynchronously provisioning the user specific native cloud developer environment exclusive to said particular developer; and automatically transmitting an electronic mail to said particular developer once the provisioning is completed, wherein the electronic mail includes a uniform resource locator link to said user specific native cloud developer environment.

According to exemplary embodiments, the instructions, when executed, may cause the processor 104 to further perform the following; establishing a connection to the user specific native cloud developer environment via the uniform resource locator link through the user interface; and cloning corresponding source code repository in connection with said particular developer to pull down project source code for developing the cloud application.

According to exemplary embodiments, the instructions, when executed, may cause the processor 104 to further perform the following: invoking corresponding provisioning application programming interface to automatically provision the user specific native cloud developer environment exclusive to said particular developer based on the identified cloud resources.

According to exemplary embodiments, the instructions, when executed, may cause the processor 104 to further perform the following: provisioning the user specific native cloud developer environment for each developer in a multi-tenant configuration as a dedicated environment such that developers can spin up or tear down the dedicated environment on demand.

According to exemplary embodiments, the instructions, when executed, may cause the processor 104 to further perform the following: hosting the user specific native cloud developer environment onto the cloud in a manner such that the developers can access cloud services and resources directly, wherein there is no contention for resources because each developer gets a dedicated environment.

According to exemplary embodiments as disclosed above in FIGS. 1-7, technical improvements effected by the instant disclosure may include a platform for implementing a platform, language, database, and cloud agnostic cloud hosted development module configured to generate a cloud hosted native environment (i.e., Linux environment) exclusively for each developer, allowing them to write, test, and debug their code in one place, i.e., allowing dynamically and instantly provision native public cloud development environments in the cloud which support writing and debugging code in the same environments, all accessible through a browser, but the disclosure is not limited thereto.

For example, according to exemplary embodiments as disclosed above in FIGS. 1-7, technical improvements effected by the instant disclosure may include a platform for implementing a platform, language, database, and cloud agnostic cloud hosted development module configured to provide: a zero-install model with no local infrastructure requirements—everything may be accessible from the browser; ease of onboarding new developers—instant developer environments on demand; consistent and reproducible team developer environments; controlled and secure environments—no ability to install unapproved packages; and environment issues identified at development time, etc., but the disclosure is not limited thereto. That is, external dependencies, especially on-premises dependencies that are not accessible, are identified earlier in the process (as the developer is writing code) which allows the developer to mitigate sooner rather than having to wait until the code is written and deployed. Knowing these issues sooner can influence architectural decisions early before too much code is written.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for developing a cloud application by utilizing one or more processors along with allocated memory, the method comprising:

implementing a cloud hosted development module (CHDM) configured to generate a user specific native cloud developer environment exclusively for corresponding developer, wherein the CHDM includes components including a launching module, an identifying module, a provisioning module, a hosting module a writing module, a determining module, and an executing module, and wherein each module being called via corresponding application programming interface (API);

launching, by calling the launching module via the corresponding API the user specific native cloud developer environment by utilizing a user interface;

identifying, by calling the identifying module via the corresponding API which cloud resources are needed to provision the user specific native cloud developer environment for a particular developer of the cloud application;

automatically provisioning, by calling the provisioning module via the corresponding API the user specific native cloud developer environment exclusive to said particular developer based on the identified cloud resources;

hosting, by calling the hosting module via the corresponding API the user specific native cloud developer environment onto a cloud, so that the user specific native cloud developer environment and the cloud run in the same environment;

writing code for developing the cloud application in an integrated development environment within the user specific native cloud developer environment that has been provisioned by calling the writing module via the corresponding API;

automatically determining, by calling the determining module via the corresponding API whether the code is working in the integrated development environment as well as in a cloud development environment within the cloud; and completing development of the cloud application, by calling the executing module via the corresponding API, based on determining that the code is working in the integrated development environment as well as in the cloud development environment, wherein the CHDM is platform, language, cloud, and database agnostic that orchestrates and passes of data through the components of the CHDM to output the cloud application regardless of platform, language, database, and cloud environment.

2. The method according to claim 1, further comprising:
provisioning the user specific native cloud developer environment in the cloud dynamically and instantly;
writing and debugging the code for developing the cloud application in the same user specific native cloud developer environment, all accessible through the user interface; and
validating the code by providing real-time feedback within the integrated development environment.

3. The method according to claim 1, further comprising:
asynchronously provisioning the user specific native cloud developer environment exclusive to said particular developer; and
automatically transmitting an electronic mail to said particular developer once the asynchronously provisioning is completed, wherein the electronic mail includes a uniform resource locator link to said user specific native cloud developer environment.

4. The method according to claim 3, further comprising:
establishing a connection to the user specific native cloud developer environment via the uniform resource locator link through the user interface; and
cloning corresponding source code repository in connection with said particular developer to pull down project source code for developing the cloud application.

5. The method according to claim 1, further comprising:
invoking corresponding provisioning application programming interface to automatically provision the user specific native cloud developer environment exclusive to said particular developer based on the identified cloud resources.

6. The method according to claim 1, wherein the cloud is a public cloud.

7. The method according to claim 1, wherein the cloud is a private cloud.

8. The method according to claim 1, further comprising:
provisioning the user specific native cloud developer environment for each developer in a multi-tenant configuration as a dedicated environment such that developers are able to spin up or tear down the dedicated environment on demand.

9. The method according to claim 8, further comprising:
hosting the user specific native cloud developer environment onto the cloud in a manner such that the developers are able to access cloud services and resources directly, wherein there is no contention for resources because each developer gets the dedicated environment.

10. A system for developing a cloud application, the system comprising:
a processor; and
a memory operatively connected to the processor via a communication interface, the memory storing computer readable instructions that, when executed, cause the processor to:
implement a cloud hosted development module (CHDM) configured to generate a user specific native cloud developer environment exclusively for corresponding developer, wherein the CHDM includes components including a launching module, an identifying module, a provisioning module, a hosting module, a writing module, a determining module, and an executing module, and wherein each module being called via corresponding application programming interface (API);
launch, by calling the launching module via the corresponding APL the user specific native cloud developer environment by utilizing a user interface;
identify, by calling the identifying module via the corresponding API which cloud resources are needed to provision the user specific native cloud developer environment for a particular developer of the cloud application;
automatically provision, by calling the provisioning module via the corresponding API the user specific native cloud developer environment exclusive to said particular developer based on the identified cloud resources;
host, by calling the hosting module via the corresponding API the user specific native cloud developer environment onto a cloud, so that the user specific native cloud developer environment and the cloud run in the same environment;
write code for developing the cloud application in an integrated development environment within the user specific native cloud developer environment that has been provisioned by calling the writing module via the corresponding API;
automatically determine, by calling the determining module via the corresponding API whether the code is working in the integrated development environment as well as in a cloud development environment within the cloud; and
complete development of the cloud application, by calling the executing module via the corresponding API, based on determining that the code is working in the integrated development environment as well as in the cloud development environment,
wherein the CHDM is platform, language cloud, and database agnostic that orchestrates and passes of data through the components of the CHDM to output the cloud application regardless of platform, language, database, and cloud environment.

11. The system according to claim 10, wherein the instructions further cause the processor to:
provision the user specific native cloud developer environment in the cloud dynamically and instantly;
write and debug the code for developing the cloud application in the same user specific native cloud developer environment, all accessible through the user interface; and
validate the code by providing real-time feedback within the integrated development environment.

12. The system according to claim 10, wherein the instructions further cause the processor to:
asynchronously provision the user specific native cloud developer environment exclusive to said particular developer; and
automatically transmit an electronic mail to said particular developer once the asynchronously provisioning is completed, wherein the electronic mail includes a uniform resource locator link to said user specific native cloud developer environment.

13. The system according to claim 12, wherein the instructions further cause the processor to;
establish a connection to the user specific native cloud developer environment via the uniform resource locator link through the user interface; and clone corresponding source code repository in connection with said particular developer to pull down project source code for developing the cloud application.

14. The system according to claim 10, wherein the instructions further cause the processor to:
invoke corresponding provisioning application programming interface to automatically provision the user specific native cloud developer environment exclusive to said particular developer based on the identified cloud resources.

15. The system according to claim 10, wherein the cloud is a public cloud.

16. The system according to claim 10, wherein the cloud is a private cloud.

17. The system according to claim 10, wherein the instructions further cause the processor to:
provision the user specific native cloud developer environment for each developer in a multi-tenant configuration as a dedicated environment such that developers are able to spin up or tear down the dedicated environment on demand.

18. The system according to claim 17, wherein the instructions further cause the processor to:
host the user specific native cloud developer environment onto the cloud in a manner such that the developers are able to access cloud services and resources directly, wherein there is no contention for resources because each developer gets the dedicated environment.

19. A non-transitory computer readable medium storing instructions for developing a cloud application, the instructions that, when executed, cause a processor to perform the following:
implementing a cloud hosted development module (CHDM) configured to generate a user specific native cloud developer environment exclusively for corresponding developer, wherein the CHDM includes components including a launching module an identifying module a provisioning module, a hosting module, a writing module, a determining module, and an executing module, and wherein each module being called via corresponding application programming interface (API);
launching, by calling the launching module via the corresponding API the user specific native cloud developer environment by utilizing a user interface;
identifying, by calling the identifying module via the corresponding API which cloud resources are needed to provision the user specific native cloud developer environment for a particular developer of the cloud application;
automatically provisioning, by calling the provisioning module via the corresponding API the user specific native cloud developer environment exclusive to said particular developer based on the identified cloud resources;
hosting, by calling the hosting module via the corresponding API, the user specific native cloud developer environment onto a cloud, so that the user specific native cloud developer environment and the cloud run in the same environment;
writing code for developing the cloud application in an integrated development environment within the user specific native cloud developer environment that has been provisioned by calling the writing module via the corresponding API;
automatically determining, by calling the determining module via the corresponding API whether the code is working in the integrated development environment as well as in a cloud development environment within the cloud; and
completing development of the cloud application, by calling the executing module via the corresponding API, based on determining that the code is working in the integrated development environment as well as in the cloud development environment,
wherein the CHDM is platform, language, cloud, and database agnostic that orchestrates and passes of data through the components of the CHDM to output the cloud application regardless of platform, language, database, and cloud environment.

20. The non-transitory computer readable medium according to claim 19, the instructions, when executed, cause the processor to further perform the following:
provisioning the user specific native cloud developer environment in the cloud dynamically and instantly;
writing and debugging the code for developing the cloud application in the same user specific native cloud developer environment, all accessible through the user interface; and
validating the code by providing real-time feedback within the integrated development environment.

* * * * *